(12) United States Patent
Mishio et al.

(10) Patent No.: US 12,614,413 B2
(45) Date of Patent: Apr. 28, 2026

(54) COMMUNICATION DEVICE, METHOD OF CONTROLLING COMMUNICATION DEVICE, AND RECORDING MEDIUM

(71) Applicant: HONDA MOTOR CO., LTD., Tokyo (JP)

(72) Inventors: Yoshihiro Mishio, Tokyo (JP); Hidekazu Shintani, Tokyo (JP); Daiki Nogami, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 18/169,995

(22) Filed: Feb. 16, 2023

(65) Prior Publication Data

US 2023/0290191 A1 Sep. 14, 2023

(30) Foreign Application Priority Data

Mar. 10, 2022 (JP) ................................. 2022-037279

(51) Int. Cl.
*G07C 5/00* (2006.01)
*G07C 5/08* (2006.01)
*H04L 67/12* (2022.01)

(52) U.S. Cl.
CPC ........... *G07C 5/008* (2013.01); *G07C 5/0841* (2013.01); *H04L 67/12* (2013.01); *G07C 2205/02* (2013.01)

(58) Field of Classification Search
CPC .. G07C 5/008; G07C 5/0841; G07C 2205/02; H04L 67/12; H04W 8/22; H04W 8/24; H04W 28/0925
USPC ....................................................... 701/31.4
See application file for complete search history.

(56) References Cited

U.S. PATENT DOCUMENTS

| | | | | |
|---|---|---|---|---|
| 9,892,573 B1 * | 2/2018 | Hsu-Hoffman | ........ | G07C 5/008 |
| 10,668,971 B2 * | 6/2020 | Denholm | ................. | B62J 45/41 |
| 10,810,809 B2 * | 10/2020 | Park | ..................... | G07C 5/0808 |
| 11,222,213 B2 * | 1/2022 | Butcher | ................ | G06V 20/56 |

(Continued)

FOREIGN PATENT DOCUMENTS

| | | |
|---|---|---|
| JP | 2009-150798 A | 7/2009 |
| JP | 2010-238022 A | 10/2010 |

(Continued)

OTHER PUBLICATIONS

Japanese Office Action dated Sep. 30, 2025 issued in corresponding Japanese application No. 2022-037279; English machine translation included (16 pages).

*Primary Examiner* — Tuan C To
*Assistant Examiner* — Dominick Mulder
(74) *Attorney, Agent, or Firm* — Rankin, Hill & Clark LLP

(57) ABSTRACT

A communication device is a communication device to be installed on a moving body, including a recording unit that records data in which a state value indicating a state of the moving body is recorded, a recording data control unit that controls recording of the recording unit, and a transmission unit that transmits the data recorded by the recording unit to a server device. The recording data control unit records, in the recording unit, first data that is the data in which the state value is changed to a particular value after the moving body is started, and restricts re-recording of the first data in the recording unit until a prescribed condition is established after the first data is recorded.

9 Claims, 9 Drawing Sheets

(56)  References Cited

U.S. PATENT DOCUMENTS

| | | | |
|---|---|---|---|
| 2009/0015684 A1* | 1/2009 | Ooga | G08G 1/0175 |
| | | | 348/222.1 |
| 2009/0318121 A1* | 12/2009 | Marumoto | G07C 5/085 |
| | | | 455/414.1 |
| 2011/0254676 A1* | 10/2011 | Marumoto | G07C 5/008 |
| | | | 340/441 |
| 2011/0304447 A1* | 12/2011 | Marumoto | G07C 5/085 |
| | | | 340/438 |
| 2017/0154477 A1* | 6/2017 | Chung | G11B 20/10527 |
| 2018/0025636 A1* | 1/2018 | Boykin | G08G 1/096725 |
| | | | 701/1 |
| 2018/0137698 A1* | 5/2018 | Yasuda | H04N 7/18 |
| 2018/0186335 A1* | 7/2018 | Chuang | B60R 25/102 |
| 2018/0268626 A1* | 9/2018 | Arashima | G08G 1/0112 |
| 2018/0286152 A1* | 10/2018 | Iwaasa | B60W 50/08 |
| 2021/0295621 A1* | 9/2021 | Kang | G06F 3/0485 |
| 2023/0063930 A1* | 3/2023 | Ichida | B60W 60/0053 |

FOREIGN PATENT DOCUMENTS

| | | |
|---|---|---|
| JP | 2012-212394 A | 11/2012 |
| JP | 6099595 B2 | 3/2017 |

* cited by examiner

FIG.1

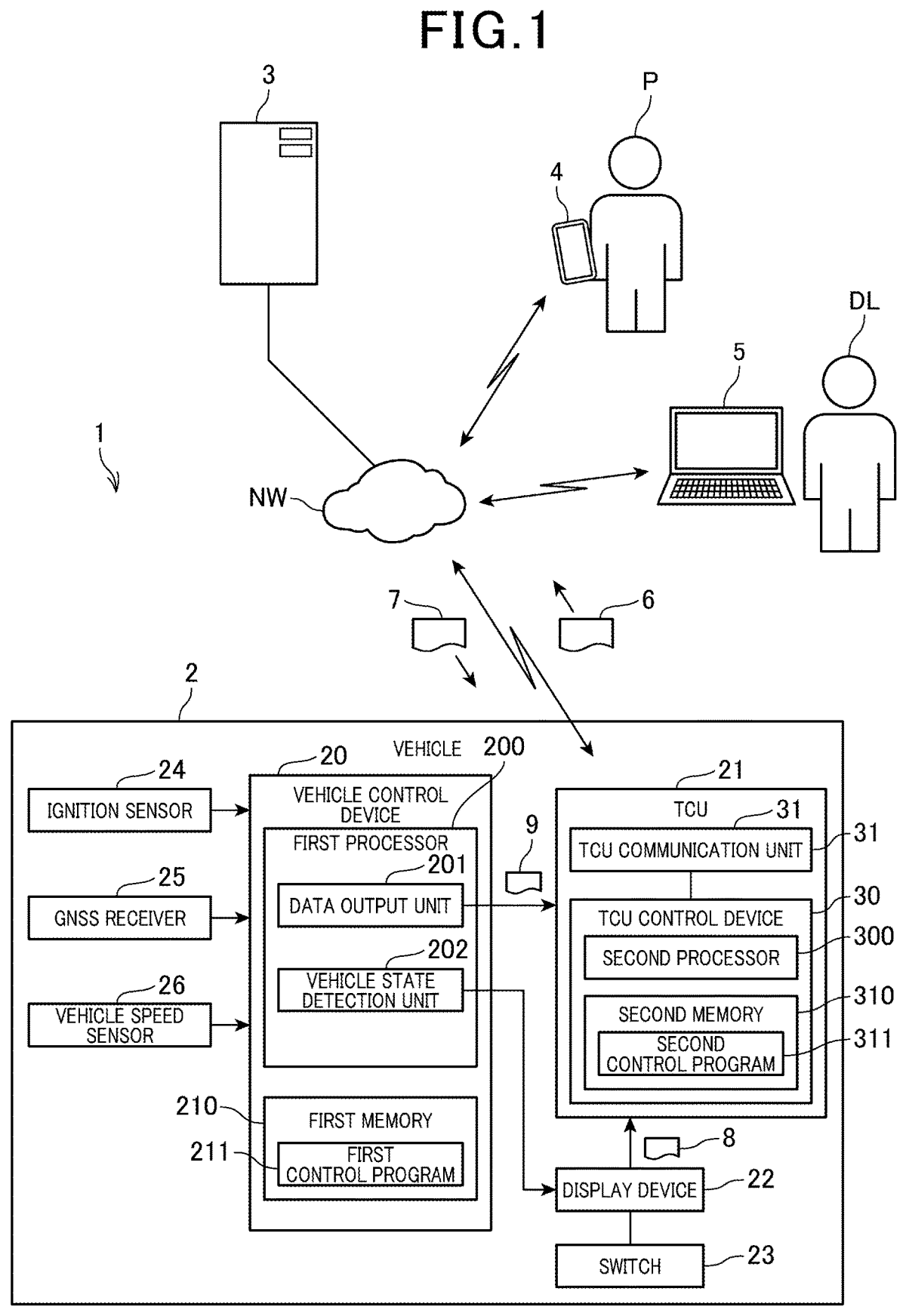

VEHICLE 200

24 IGNITION SENSOR

25 GNSS RECEIVER

26 VEHICLE SPEED SENSOR

20 VEHICLE CONTROL DEVICE

200 FIRST PROCESSOR

201 DATA OUTPUT UNIT

202 VEHICLE STATE DETECTION UNIT

210 FIRST MEMORY

211 FIRST CONTROL PROGRAM

21 TCU

31 TCU COMMUNICATION UNIT

30 TCU CONTROL DEVICE

300 SECOND PROCESSOR

310 SECOND MEMORY

311 SECOND CONTROL PROGRAM

22 DISPLAY DEVICE

23 SWITCH

FIG.3

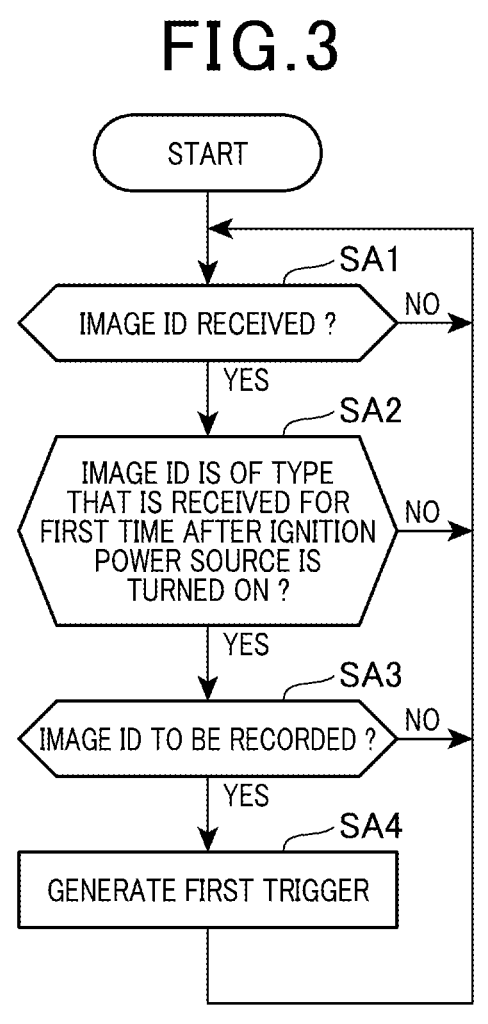

START

SA1

IMAGE ID RECEIVED ?    NO

YES

SA2

IMAGE ID IS OF TYPE
THAT IS RECEIVED FOR
FIRST TIME AFTER IGNITION
POWER SOURCE IS
TURNED ON ?    NO

YES

SA3

IMAGE ID TO BE RECORDED ?    NO

YES

SA4

GENERATE FIRST TRIGGER

FIG.4

START

SB1

TRANSMISSION
INSTRUCTION
DATA RECEIVED ?

NO

YES

SB2

GENERATE SECOND TRIGGER

FIG.5

START

SC1

FIRST TRIGGER
GENERATED ?

NO

YES

SC2

RECORD IMAGE ID AND
VEHICLE DATA IN ASSOCIATION
WITH EACH OTHER

FIG.7

```
          START

│
            ▼
        ┌─────────────┐  SE1
        │ THIRD TRIGGER │────── NO ──────┐
        │ GENERATED ?   │                │
        └─────────────┘                 │
            │ YES                        │
            ▼                            │
    ┌──────────────────┐  SE2            │
    │ GENERATE UPLOAD DATA │             │
    └──────────────────┘                 │
            │                            │
            ▼                            │
    ┌──────────────────┐  SE3            │
    │ OUTPUT UPLOAD DATA │               │
    └──────────────────┘                 │
            │                            │
            └────────────────────────────┘
```

COMMUNICATION DEVICE, METHOD OF CONTROLLING COMMUNICATION DEVICE, AND RECORDING MEDIUM

INCORPORATION BY REFERENCE

The present application claims priority under 35 U.S.C. § 119 to Japanese Patent Application No. 2022-037279 filed on Mar. 10, 2022. The content of the application is incorporated herein by reference in its entirety.

BACKGROUND OF THE INVENTION

Field of the Invention

The present invention relates to a communication device, a method of controlling a communication device, and a recording medium.

Description of the Related Art

Conventionally, technologies for transmitting data to server devices have been known (see, for example, Japanese Patent No. 6099595). Japanese Patent No. 6099595 discloses an external communication device that transmits data to a server of a service center.

However, in Japanese Patent No. 6099595, a server may receive data sets including overlapped contents. When a conventional server device processes data received from a communication device, the server device performs processing of selecting any one of data sets, out of the data sets including overlapped contents, as data to be processed, and removing other data sets from the data to be processed. Consequently, the server according to Japanese Patent No. 6099595 suffers from a problem of increased processing load of the data received from an external communication device.

Accordingly, an object of the present invention is to provide a communication device, a method of controlling the communication device, and a recording medium, capable of reducing processing load of a server device.

SUMMARY OF THE INVENTION

One aspect of the present invention is a communication device to be installed on a moving body. The communication device includes a recording unit that records data in which a state value indicating a state of the moving body is recorded, a recording data control unit that controls recording of the recording unit, and a transmission unit that transmits the data recorded by the recording unit to a server device. The recording data control unit records, in the recording unit, first data that is the data in which the state value is changed to a particular value after the moving body is started, and restricts re-recording of the first data in the recording unit until a prescribed condition is established after the first data is recorded.

According to one aspect of the present invention, processing load of a server device can be reduced.

BRIEF DESCRIPTION OF THE DRAWINGS

FIG. 1 shows the configuration of an information processing system.

FIG. 3 is a flowchart showing the operation of a recording trigger generation unit;
FIG. 4 is a flowchart showing the operation of the recording trigger generation unit;
FIG. 5 is a flowchart showing the operation of a recording unit;
FIG. 7 is a flowchart showing the operation of the recording unit.

DETAILED DESCRIPTION OF THE PREFERRED EMBODIMENTS

1. Configuration of Information Processing System

Figure 2:
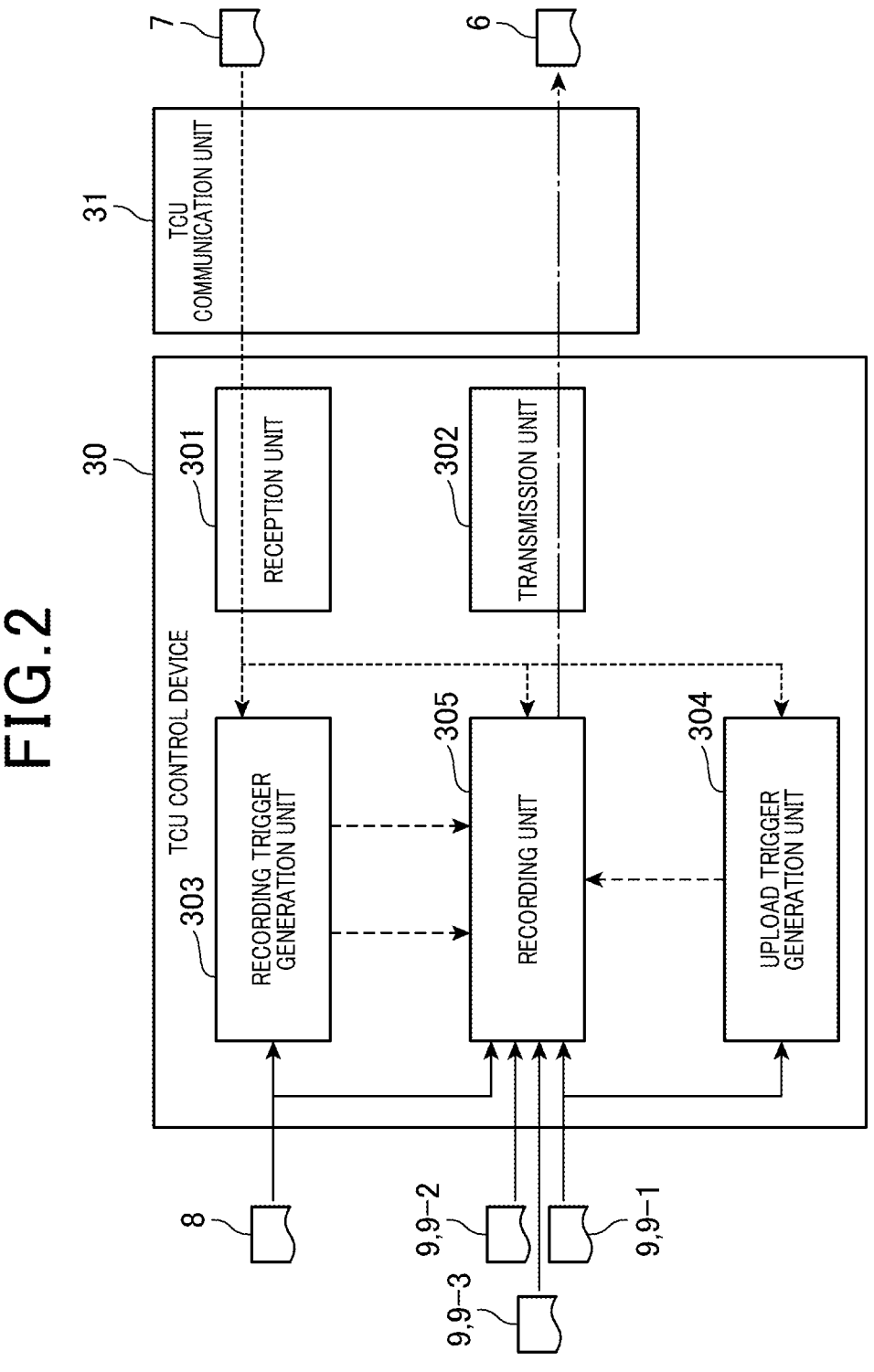
FIG. 2 is an explanatory view of functional units of a second processor.

FIG. 1 shows the configuration of an information processing system 1.

The information processing system 1 includes a vehicle 2 and a server device 3.

The vehicle 2 may be a four-wheeled vehicle or a vehicle other than the four-wheeled vehicle. The vehicle 2 is an example of a "moving body".

The vehicle 2 includes a telematics control unit (TCU) 21, and communicates with a server device 3 which is connected to a network NW via the TCU 21. The network NW is a communication network constituted of, for example, a public line network, a dedicated line, or other communication circuits. The vehicle 2 transmits upload data 6 to the server device 3. The upload data 6 is data to be uploaded to the server device 3. The vehicle 2 transmits the upload data 6 to the server device 3, when an ignition power source of the vehicle 2 is switched from ON to OFF, or when the vehicle 2 receives transmission instruction data 7 indicating a transmission instruction of the upload data 6, from the server device 3. The details of the upload data 6 are described later.

The TCU 21 is an example of a "communication device" (transmitter/receiver, circuit).

The server device 3 is a device (computer) that performs information processing, with devices connected to the network NW as clients. The server device 3 in the present embodiment performs processing, such as data analysis, on the upload data 6 received from the vehicle 2, and notifies the information obtained from the upload data 6 to a smartphone 4 used by a user P of the vehicle 2 or to a personal computer (PC) 5 used by a dealer DL of the vehicle 2. The server device 3 in the present embodiment notifies a failure of the vehicle 2 and information including the content of the failure by analyzing the upload data 6.

2. Vehicle Configuration

The configuration of the vehicle 2 is described with reference to FIG. 1.

The vehicle 2 includes a vehicle control device 20, the TCU 21, a display device 22 (display), a switch 23, an ignition sensor 24, a global navigation satellite system (GNSS) receiver 25 and a vehicle speed sensor 26.

The vehicle control device 20 includes a first processor 200, such as a central processing unit (CPU) or a microprocessing unit (MPU), a first memory 210, and an interface circuit connected to other devices and sensors.

The first memory 210 is a storage device that stores programs executed by the first processor 200, and data, in a non-volatile manner. The first memory 210 is constituted of a magnetic storage device, a semiconductor storage device such as a flash read only memory (ROM), or a non-volatile storage device of other types. The first memory 210 may also include a random access memory (RAM) that constitutes a work area of the first processor 200. The first memory 210 may also include a non-volatile storage device, such as a hard disk drive (HDD), and a solid state drive (SSD). The first memory 210 stores data processed by the first processor 200 and a first control program 211 executed by the first processor 200.

The vehicle control device 20 is connected to the TCU 21, the display device 22, the ignition sensor 24, the GNSS receiver 25, and the vehicle speed sensor 26. The devices connected to the vehicle control device 20 are not limited to the listed devices, and may include other types of devices.

The TCU 21 includes a TCU control device 30 and a TCU communication unit 31.

The TCU control device 30 includes a second processor 300, such as a CPU or an MPU, a second memory 310, and an interface circuit connected to other devices and sensors.

The second processor 300 is an example of a "processor".

The second memory 310 is a storage device that stores programs executed by the second processor 300, and data, in a non-volatile manner. The second memory 310 is constituted of a magnetic storage device, a semiconductor storage device such as a flash ROM, or a non-volatile storage device of other types. The second memory 310 may also include a RAM that constitutes a work area of the second processor 300. The second memory 310 may also include a non-volatile storage device such as an HDD and an SSD. The second memory 310 stores data processed by the second processor 300, and a second control program 311 executed by the second processor 300.

The second control program 311 is an example of a "program".

The TCU communication unit 31 includes communication hardware such as a wireless communication circuit, and communicates with the server device 3 under the control of the TCU control device 30.

The display device 22 is a device provided on a meter panel in an instrument panel, the device being a multi information display (MID). The display device 22 notifies the state of the vehicle 2 to the driver through information display. The notification content notified by the display device 22 is roughly divided into a normal content and a failure content. The normal content indicates the state of the vehicle 2 when the vehicle 2 has no failure. Examples of the normal content may include that a door of the vehicle 2 is in an open state and that the vehicle 2 is about to run out of gasoline. The failure content indicates that vehicle 2 is in a failed state. Examples of the failure content may include an engine failure and a brake failure.

The notification contents notified by the display device 22 are each assigned an image identification (ID) 8. The image ID 8 is data that uniquely identifies the notification content displayed by the display device 22. The image ID 8 is not assigned to the normal content and the failure content as described above, but is assigned to each of the more detailed notification contents obtained by subdividing the normal content and the failure content. In the image ID 8, a value indicating the state of the vehicle 2 (hereafter referred to as a "state value") is recorded. The state value recorded in the image ID is different for each notification content notified by the display device 22. The state value recorded in the image ID 8 is different for each of the more detailed notification contents obtained by subdividing the normal content and the failure content.

The display device 22 outputs to the TCU 21 the image ID 8 corresponding to the notified notification content. The display device 22 stores, in a prescribed storage area, a table that associates the notification contents with the image IDs 8, and outputs to the TCU 21 the image ID 8 corresponding to the notified notification content, with reference to the table.

The display device 22 is connected to the switch 23. The switch 23 is provided on a steering wheel used for steering the vehicle 2. The switch 23 is a switch for switching the notification content notified by the display device 22 to other contents of notification. When the switch 23 is operated, the display device 22 switches information on the state of the vehicle 2 which is currently displayed to information on another state of the vehicle 2 which has been displayed since the ignition power source of the vehicle 2 was turned on. The display device 22 can display again the information on the state of the vehicle 2 displayed in the past since the ignition power source of the vehicle 2 was turned on. Therefore, the user of the vehicle 2 can operate the switch 23 a plurality of times to display the information on the state of the vehicle 2, which has already been displayed since the ignition power source of the vehicle 2 was turned on, again on the display device 22. When the notification content to be notified is switched, the display device 22 outputs to the TCU 21 the image ID 8 corresponding to the switched notification content.

The ignition sensor 24 is a sensor that detects whether the ignition power source of the vehicle 2 is ON or OFF. The ignition sensor 24 outputs to the vehicle control device 20 power source state data 9-1 indicating whether the ignition power source is ON or OFF.

The GNSS receiver 25, which is a device for detecting a current position of the vehicle 2, receives positioning signals transmitted from a plurality of positioning satellites. The GNSS receiver 25 outputs current position data 9-2 indicating the current position of the vehicle 2, to the vehicle control device 20.

The vehicle speed sensor 26 is a sensor for detecting the speed of the vehicle 2. The vehicle speed sensor 26 outputs vehicle speed data 9-3 indicating the speed of the vehicle 2, to the vehicle control device 20.

The power source state data 9-1, the current position data 9-2, and the vehicle speed data 9-3 are data that can vary over time and that relate to the vehicle 2. Hereinafter, the power source state data 9-1, the current position data 9-2 and the vehicle speed data 9-3, when not distinguished from each other, are referred to as "vehicle data" and designated by reference numeral "9".

The vehicle data 9 is an example of "second data".

The first processor 200 of the vehicle control device 20 functions as a data output unit 201 and a vehicle state detection unit 202 by reading and executing the first control program 211 stored in the first memory 210.

The data output unit 201 outputs the vehicle data 9 to the TCU 21.

The vehicle state detection unit 202 detects the state of the vehicle 2. The vehicle state detection unit 202 outputs the detection result to the display device 22. The display device 22 notifies the state of the vehicle 2 as indicated by the detection result received from the vehicle state detection unit 202. For example, the vehicle state detection unit 202 detects whether a door is open or not, as the state of the vehicle 2, based on a signal of a door switch that detects the opening or closing of the door. For example, the vehicle state detection unit 202 also detects whether or not the vehicle 2 is about to run out of gasoline, based on a signal from a sensor that detects the position of a float in a fuel tank. For example, the vehicle state detection unit 202 also detects whether the engine has failure or not, based on a signal of, for example, a sensor that detects engine oil or a sensor that detects overheating. For example, the vehicle state detection unit 202 detects whether the brake has failure or not, based on a signal of, for example, a sensor that detects hydraulic pressure of the brake.

3. Functional Units of Second Processor

Description is now given of the functional units of the second processor 300.

FIG. 2 is an explanatory view of the functional units of the second processor 300.

The second processor 300 functions as a reception unit 301, a transmission unit 302, a recording trigger generation unit 303, an upload trigger generation unit 304 and a recording unit 305, by reading and executing the second control program 311.

The recording trigger generation unit 303 is an example of a "recording data control unit".

3-1. Reception Unit

The reception unit 301 receives the transmission instruction data 7 from the server device 3 via the TCU communication unit 31. upon receipt of the transmission instruction data 7 from the server device 3, the reception unit 301 outputs the received transmission instruction data 7 to the recording trigger generation unit 303, the upload trigger generation unit 304 and the recording unit 305.

3-2. Recording Trigger Generation Unit

The recording trigger generation unit 303 records in the recording unit 305 the image ID 8 indicating a particular value as the state value after the ignition power source of the vehicle 2 is turned on, and restricts re-recording of the image ID 8 in the recording unit 305, until a prescribed condition is established after the image ID 8 indicating the particular value is recorded. The image ID 8 indicating a particular value as the state value is an example of "first data". Here, the prescribed condition is that the ignition power source is turned off.

The recording trigger generation unit 303 generates a trigger of recording the image ID 8 indicating a particular value and the vehicle data 9 for the recording unit 305. The recording trigger generation unit 303 receives the image ID 8 output by the display device 22. The recording trigger generation unit 303 also receives the transmission instruction data received by the reception unit 301 from the reception unit 301. The recording trigger generation unit 303 generates a first trigger or a second trigger for the recording unit 305.

Here, description is given of the operation of the recording trigger generation unit 303 when the first trigger is generated.

FIG. 3 is a flowchart showing the operation of the recording trigger generation unit 303.

The recording trigger generation unit 303 determines whether or not the image ID 8 is received from the display device 22 (step SA1).

When it is determined that the image ID 8 is not received from the display device 22 (step SA1: NO), the recording trigger generation unit 303 performs determination of step SA1 again.

When it is determined that the image ID 8 is received from the display device 22 (step SA1: YES), the recording trigger generation unit 303 determines whether or not the image ID 8 received from the display device 22 is the image ID 8 of a type that is received for the first time after the ignition power source is turned on (step SA2). The determination of step SA2 is performed based on the state value recorded in the image ID 8. The recording trigger generation unit 303 records in a prescribed storage area the state values of the image IDs 8, received from the display device 22 after the ignition power source of the vehicle 2 is turned on, and performs determination of step SA2 by referring to the state values recorded in the prescribed storage area.

When it is determined that the image ID 8 received from the display device 22 is not the image ID 8 of the type that is received for the first time after the ignition power source is turned on (step SA2: NO), the recording trigger generation unit 303 returns the processing to step SA1.

Meanwhile, When it is determined that the image ID 8 is the image ID 8 of the type that is received for the first time after the ignition power source is turned on (step SA2: YES), the recording trigger generation unit 303 then determines whether or not the image ID 8 is an image ID 8 to be recorded by the recording unit 305 (step SA3). The image IDs 8 to be recorded by the recording unit 305, in the present embodiment, are the image IDs 8 corresponding to the notification contents belonging to the failure content. When the state value (particular value) of the image ID 8 to be recorded by the recording unit 305 is recorded in the prescribed storage area, the recording trigger generation unit 303 performs determination of step SA3 based on whether or not the state value of the image ID 8 received from the display device 22 is a particular value recorded in the prescribed storage area.

When it is determined that the image ID 8 is not the image ID 8 to be recorded by the recording unit 305 (step SA3: NO), the recording trigger generation unit 303 returns the processing to step SA1.

Meanwhile, When it is determined that the image ID 8 is the image ID 8 to be recorded by the recording unit 305 (step SA3: YES), the recording trigger generation unit 303 generates a first trigger for the recording unit 305 (step SA4). Specifically, the recording trigger generation unit 303 transmits first trigger information indicating the first trigger to the recording unit 305.

Next, description is given of the operation of the recording trigger generation unit 303 when a second trigger is generated.

Figure 4:
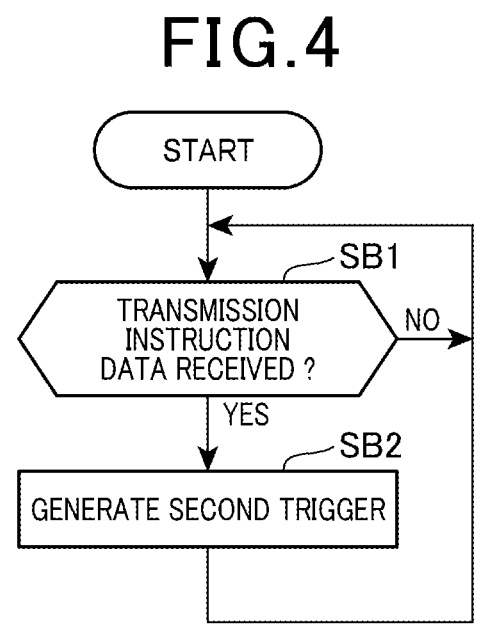

FIG. 4 is a flowchart showing the operation of the recording trigger generation unit 303.

The recording trigger generation unit 303 determines whether or not the transmission instruction data 7 is received from the reception unit 301 (step SB1).

When it is determined that the transmission instruction data 7 is not received from the reception unit 301 (step SB1: NO), the recording trigger generation unit 303 performs determination of step SB1 again.

When it is determined that the transmission instruction data 7 is received from the reception unit 301 (step SB1: YES), the recording trigger generation unit 303 generates a second trigger for the recording unit 305 (step SB2). Specifically, the recording trigger generation unit 303 transmits second trigger information indicating the second trigger to the recording unit 305.

3-3. Recording Unit

The recording unit 305 receives the image ID 8 from the display device 22. The recording unit 305 and the recording trigger generation unit 303 receive the image ID 8 of the same type. The recording unit 305 also receives the vehicle data 9 from the vehicle control device 20. When the recording trigger generation unit 303 generates a first trigger, the recording unit 305 records the latest image ID 8 received from the display device 22 and the latest vehicle data 9 received from the vehicle control device 20, in association with each other, in the second memory 310. The data recorded by the recording unit 305 is erased from the second memory 310 when the ignition power source of the vehicle 2 is switched from ON to OFF.

Figure 5:
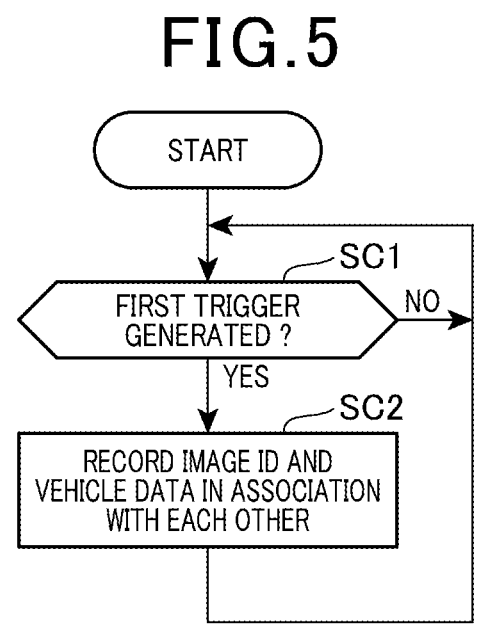

FIG. 5 is a flowchart showing the operation of the recording unit 305.

The recording unit 305 determines whether or not a first trigger is generated (step SC1). When it is determined that the first trigger is not generated (step SC1: NO), the recording unit 305 performs determination of SC1 again.

Meanwhile, When it is determined that the first trigger is generated (step SC1: YES), the recording unit 305 records the image ID 8 received from the display device 22 and the vehicle data 9 received from the vehicle control device 20, in association with each other (step SC2).

When the recording trigger generation unit 303 generates a second trigger, the recording unit 305 does not record the image ID 8 received from the display device 22, and on the other hand, records the vehicle data 9 received from the vehicle control device 20. Specifically, when the recording trigger generation unit 303 generates the second trigger, the recording unit 305 records the vehicle data 9 which is associated with null data, in the second memory 310.

Figure 6:
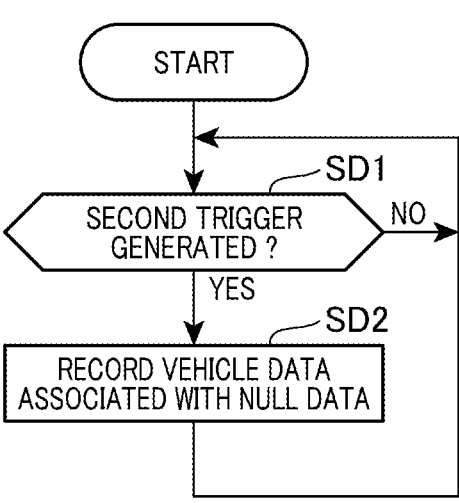
FIG. 6 is a flowchart showing the operation of the recording unit.

FIG. 6 is a flowchart showing the operation of the recording unit 305.

The recording unit 305 determines whether or not a second trigger is generated (step SD1). When it is determined that the second trigger is not generated (step SD1: NO), the recording unit 305 performs determination of step SD1 again.

Meanwhile, When it is determined that the second trigger is generated (step SD1: YES), the recording unit 305 records the vehicle data 9 associated with null data (step SD2).

When an upload trigger generation unit 304 described later generates a third trigger, the recording unit 305 generates the upload data 6 including the image ID 8 and the vehicle data 9 recorded in the second memory 310, and outputs the generated upload data 6 to the transmission unit 302.

Figure 7:
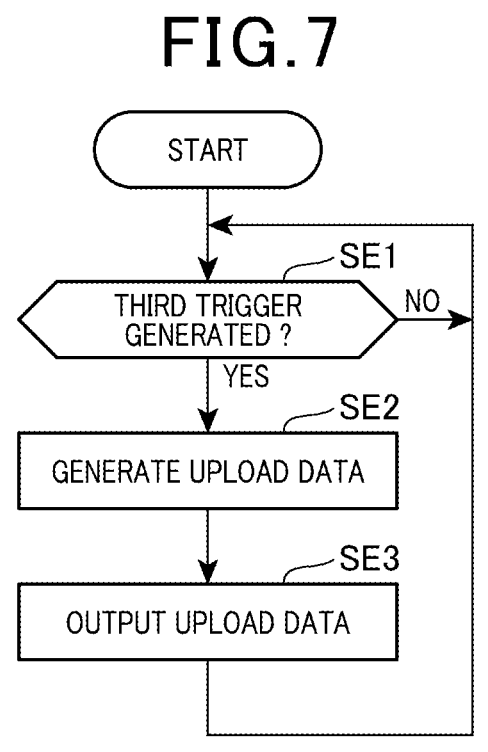

FIG. 7 is a flowchart showing the operation of the recording unit 305.

The recording unit 305 determines whether or not a third trigger is generated (step SE1). When it is determined that the third trigger is not generated (step SE1: NO), the recording unit 305 performs determination of step SE1 again.

Meanwhile, When it is determined that the third trigger is generated (step SE1: YES), the recording unit 305 generates the upload data 6 (step SE2).

The recording unit 305 then outputs the generated upload data 6 to the transmission unit 302 (step SE3).

3-4. Upload Trigger Generation Unit

The upload trigger generation unit 304 generates, for the recording unit 305, a third trigger which is a trigger of transmitting the upload data 6. The upload trigger generation unit 304 receives the power source state data 9-1 from the vehicle control device 20. The upload trigger generation unit 304 also receives the transmission instruction data 7 from the reception unit 301, when the reception unit 301 receives the transmission instruction data 7.

Figure 8:
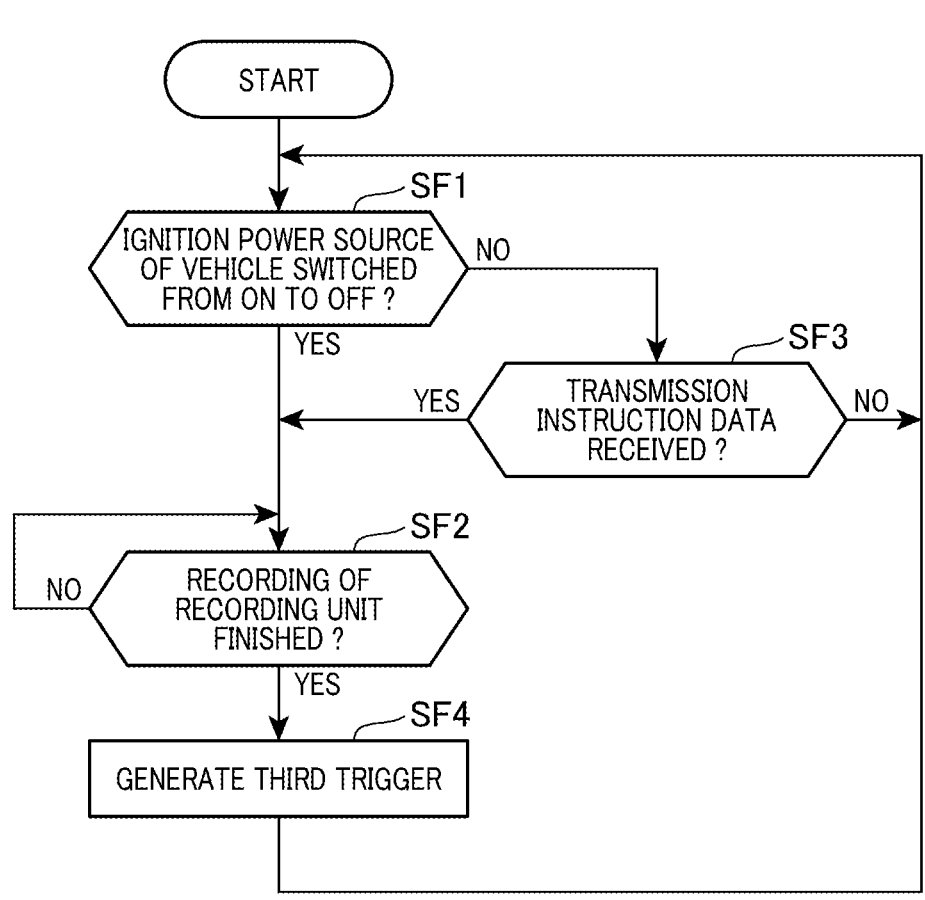
FIG. 8 is a flowchart showing the operation of an upload trigger generation unit.

FIG. 8 is a flowchart showing the operation of the upload trigger generation unit 304.

The upload trigger generation unit 304 determines whether or not the ignition power source of the vehicle 2 is switched from ON to OFF, based on the power source state data 9-1 received from the vehicle control device 20 (step SF1).

The upload trigger generation unit 304 performs processing of step SF2, When it is determined that the ignition power source of the vehicle 2 is switched from ON to OFF (step SF1: YES).

When it is determined that the ignition power source of the vehicle 2 is not switched from ON to OFF (step SF1: NO), the upload trigger generation unit 304 determines whether or not the transmission instruction data 7 is received from the reception unit 301 (step SF3).

When it is determined that the transmission instruction data 7 is not received (step SF3: NO), the upload trigger generation unit 304 returns the processing to step SF1. Meanwhile, When it is determined that the transmission instruction data 7 is received (step SF3: YES), the upload trigger generation unit 304 performs processing of step SF2.

In step SF2, the upload trigger generation unit 304 determines whether or not recording of the recording unit 305 is finished (step SF2). When it is determined that recording of the recording unit 305 is not finished (step SF2: NO), the upload trigger generation unit 304 performs determination of step SF2 again.

Meanwhile, When it is determined that the recording of the recording unit 305 is finished (step SF2: YES), the upload trigger generation unit 304 generates a third trigger for the recording unit 305 (step SF4). Specifically, the upload trigger generation unit 304 outputs third trigger information indicating the third trigger to the recording unit 305.

3-5. Transmission Unit

The transmission unit 302 transmits the upload data 6 received from the recording unit 305 to the server device 3.

Next, the operation of the TCU 21 is specifically described with reference to FIG. 9.

Figure 9:
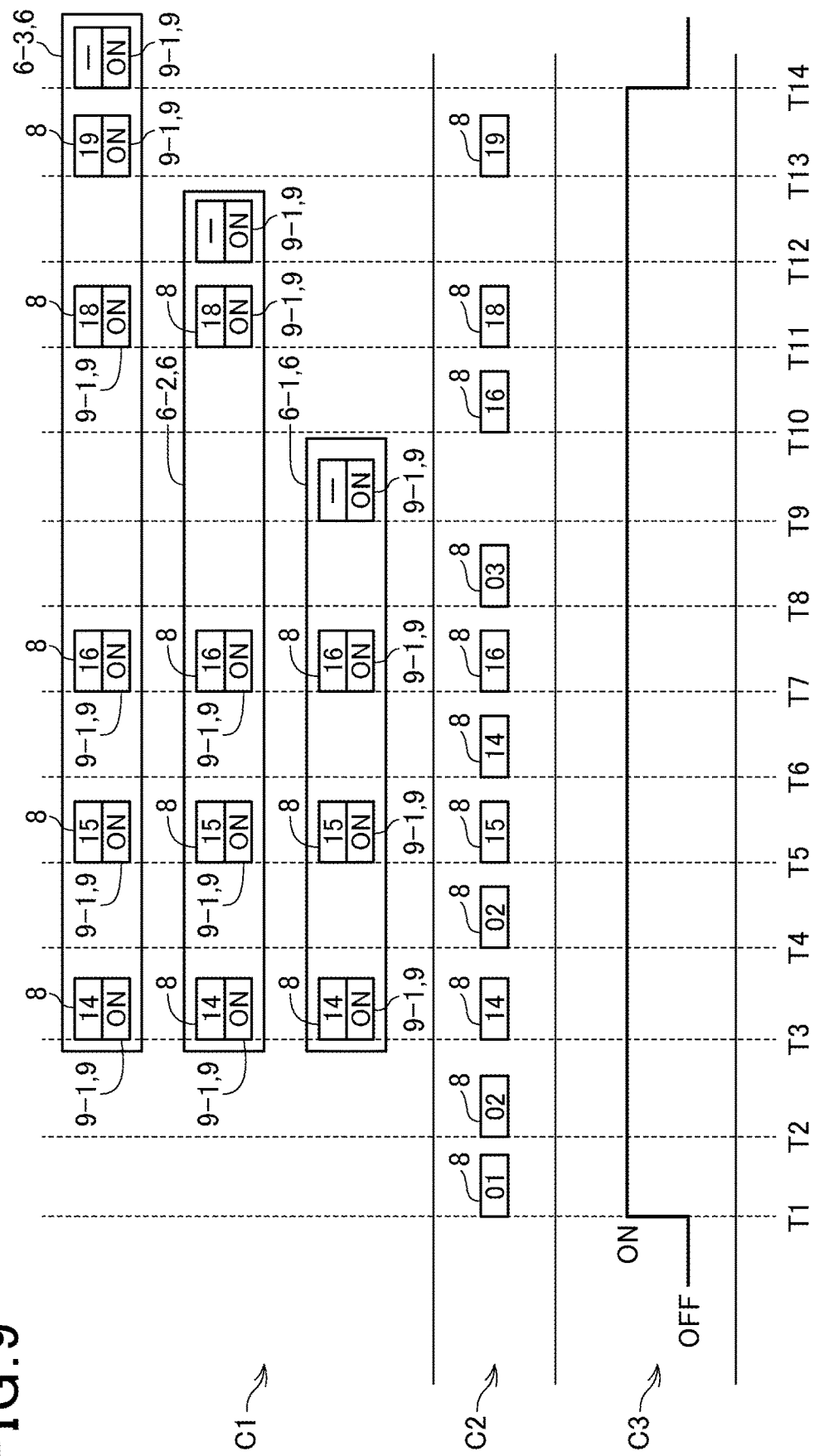
FIG. 9 is a timing chart showing the operation of a TCU.

FIG. 9 shows a timing chart for describing recording of the recording unit 305 and transmission of the transmission unit 302. In FIG. 9, a chart C1 shows the image IDs 8 and the vehicle data 9 recorded by the recording unit 305, and the upload data 6 transmitted by the transmission unit 302. In FIG. 9, a chart C2 shows the types of the image IDs 8 output by the display device 22. In FIG. 9, a chart C3 shows the state of the ignition power source of the vehicle 2.

The example of FIG. 9 describes the case of recording the power source state data 9-1 as the vehicle data 9 recorded by the recording unit 305.

In the example of FIG. 9, the state value recorded in each of the image IDs 8 is expressed by a two-digit numerical value. As illustrated in FIG. 9, the image ID 8, in which any one of the state value: 14, the state value: 15, the state value: 16, the state value: 18, and the state value: 19 is recorded, is the image ID 8 to be recorded. In other words, in the example shown in FIG. 9, the state value: 14, the state value: 15, the state value: 16, the state value: 18, and the state value: 19 are particular values. Therefore, the image ID 8, in which any one of the state value: 14, the state value: 15, the state value: 16, the state value: 18, and the state value: 19 is recorded, is the image ID 8 corresponding to the failure content.

In the example shown in FIG. 9, two-digit numerical values are illustrated as the state value. However, the state value may be numerical values other than the two-digit numerical values, and may also include a letter and a symbol.

In FIG. 9, the ignition power source of the vehicle 2 is turned on at timing T1. Upon the ignition power source being turned on, at timing T1, the display device 22 notifies a notification content corresponding to the image ID 8 in which the state value: 01 is recorded, and with the notification, outputs the image ID 8 in which the state value: 01 is recorded, to the TCU 21. In the example of FIG. 9, the image ID 8 in which the state value: 01 is recorded is not the image ID 8 to be recorded. Therefore, the image ID 8 in which the state value: 01 is recorded is not recorded in the recording unit 305.

In FIG. 9, at timing T2, the display device 22 notifies a notification content corresponding to the image ID 8 in which the state value: 02 is recorded, and with the notification, outputs the image ID 8 in which the state value: 02 is recorded, to the TCU 21. In the example of FIG. 9, the image ID 8 in which the state value: 02 is recorded is not the image ID 8 to be recorded. Therefore, the image ID 8 in which the state value: 02 is recorded is not recorded in the recording unit 305.

In FIG. 9, at timing T3, the display device 22 notifies a notification content corresponding to the image ID 8 in which the state value: 14 is recorded, and with the notification, outputs the image ID 8 in which the state value: 14 is recorded, to the TCU 21. In the example of FIG. 9, the image ID 8 in which the state value: 14 is recorded is the image ID 8 to be recorded. Therefore, at timing T3, the recording unit 305 records the image ID 8 in which the state value: 14 is recorded, in association with the power source state data 9-1 indicating that the ignition power source is ON.

The switch 23 is operated, and at timing T4, in FIG. 9, the display device 22 notifies a notification content corresponding to the image ID 8 in which the state value: 02 is recorded, again. With this notification, the display device 22 outputs the image ID 8 in which the state value: 02 is recorded, to the TCU 21 at timing T4. However, the image ID 8 in which the state value: 02 is recorded is not recorded in the recording unit 305.

In FIG. 9, at timing T5, the display device 22 notifies a notification content corresponding to the image ID 8 in which the state value: 15 is recorded, and with the notification, outputs the image ID 8 in which the state value: 15 is recorded, to the TCU 21. In the example in FIG. 9, the image ID 8 in which the state value: 15 is recorded is the image ID 8 to be recorded. Therefore, at timing T5, the recording unit 305 records the image ID 8 in which the state value: 15 is recorded, in association with the power source state data 9-1 indicating that the ignition power source is ON.

The switch 23 is operated, and at timing T6, in FIG. 9, the display device 22 notifies a notification content corresponding to the image ID 8 in which the state value: 14 is recorded, again. With this notification, the display device 22 outputs the image ID 8 in which the state value: 14 is recorded, to the TCU 21 at timing T6. However, the image ID 8 output at timing T6 is not the image ID 8 of a type that is output to the TCU 21 for the first time after the ignition power source is turned on. Therefore, at timing T6, the recording trigger generation unit 303 does not generate a first trigger, and the recording unit 305 does not record the image ID 8 in which the state value: 14 is recorded, at timing T6. In FIG. 9, at timing T7, the display device 22 notifies a notification content corresponding to the image ID 8 in which the state value: 16 is recorded, and with the notification, outputs the image ID 8 in which the state value: 16 is recorded, to the TCU 21. In the example of FIG. 9, the image ID 8 in which the state value: 16 is recorded is the image ID 8 to be recorded. Therefore, at timing T7, the recording unit 305 records the image ID 8 in which the state value: 16 is recorded, in association with the power source state data 9-1 indicating that the ignition power source is ON.

In FIG. 9, at timing T8, the display device 22 notifies a notification content corresponding to the image ID 8 in which the state value: 03 is recorded, and with the notification, outputs the image ID 8 in which the state value: 03 is recorded, to the TCU 21. In the example of FIG. 9, the image ID 8 in which the state value: 03 is recorded is not the image ID 8 to be recorded. Therefore, the image ID 8 in which the state value: 03 is recorded is not recorded in the recording unit 305.

In FIG. 9, at timing T9, the reception unit 301 receives the transmission instruction data 7 from the server device 3. With the reception, at timing T9, the recording unit 305 records the power source state data 9-1 which is associated with null data. When the recording of the recording unit 305 is finished, the upload trigger generation unit 304 issues a third trigger, and the transmission unit 302 transmits upload data 6-1 to the server device 3 after timing T9. The upload data 6-1 includes the image IDs 8 and the vehicle data 9 recorded after the ignition power source is turned on. Specifically, the upload data 6-1 includes a combination of the image ID 8 with the state value: 14 and the power source state data 9-1, a combination of the image ID 8 with the state value: 15 and the power source state data 9-1, a combination of the image ID 8 with the state value: 16 and the power source state data 9-1, and a combination of null data and the power source state data 9-1.

The Switch 23 is operated, and at timing T10, in FIG. 9, the display device 22 notifies a notification content corresponding to the image ID 8 in which the state value: 16 is recorded, again. With this notification, the display device 22 outputs the image ID 8 in which the state value: 16 is recorded, to the TCU 21 at timing T10. However, the image ID 8 output at timing T10 is not the image ID 8 of the type that is output to the TCU 21 for the first time after the ignition power source is turned on. Therefore, at timing T10, the recording trigger generation unit 303 does not generate a first trigger, and the recording unit 305 does not record, at timing T10, the image ID 8 in which the state value: 16 is recorded.

In FIG. 9, at timing T11, the display device 22 notifies a notification content corresponding to the image ID 8 in which the state value: 18 is recorded, and with the notification, outputs the image ID 8 in which the state value: 18 is recorded, to the TCU 21. In the example in FIG. 9, the image ID 8 in which the state value: 18 is recorded is the image ID 8 to be recorded. Therefore, at timing T11, the recording unit 305 records the image ID 8 in which the state value: 18 is recorded, in association with the power source state data 9-1 indicating that the ignition power source is ON.

In FIG. 9, at timing T12, the reception unit 301 receives the transmission instruction data 7 from the server device 3. With the reception, at timing T12, the recording unit 305 records the power source state data 9-1 associated with null data. When the recording of the recording unit 305 is finished, the upload trigger generation unit 304 issues a third trigger, and the transmission unit 302 transmits upload data 6-2 to the server device 3. The upload data 6-2 includes the image IDs 8 and the vehicle data 9 recorded after the ignition power source is turned on. Specifically, the upload data 6-2 includes a combination of the image ID 8 with the state value: 14 and the power source state data 9-1, a combination of the image ID 8 with the state value: 15 and the power source state data 9-1, a combination of the image ID 8 with the state value: 16 and the power source state data 9-1, a combination of the image ID 8 with the state value: 18 and the power source state data 9-1, and a combination of null data and the power source state data 9-1.

In FIG. 9, at timing T13, the display device 22 notifies a notification content corresponding to the image ID 8 in which the state value: 19 is recorded, and with the notification, outputs the image ID 8 in which the state value: 19 is recorded, to the TCU 21. In the example of FIG. 9, the image ID 8 in which the state value: 19 is recorded is the image ID 8 to be recorded. Therefore, at timing T13, the recording unit 305 records the image ID 8 in which the state value: 19 is recorded, in association with the power source state data 9-1 indicating that the ignition power source is ON.

In FIG. 9, at timing T14, the ignition power source of the vehicle 2 is switched from ON to OFF. With the reception, at timing T14, the recording unit 305 records the power source state data 9-1 associated with null data. When the recording of the recording unit 305 is finished, the upload trigger generation unit 304 issues a third trigger, and the transmission unit 302 transmits upload data 6-3 to the server device 3. The upload data 6-3 includes the image IDs 8 and the vehicle data 9 recorded after the ignition power source is turned on. Specifically, the upload data 6-2 includes a combination of the image ID 8 with the state value: 14 and the power source state data 9-1, a combination of the image ID 8 with the state value: 15 and the power source state data 9-1, a combination of the image ID 8 with the state value: 16 and the power source state data 9-1, a combination of the image ID 8 with the state value: 18 and the power source state data 9-1, a combination of the image ID 8 with the state value: 19 and the power source state data 9-1, and a combination of null data and the power source state data 9-1.

4. Other Embodiments

The embodiment described above shows only one aspect, and any deformations and applications are possible.

In another embodiment, the server device 3 may specify the type of the image ID 8 to be recorded by the recording unit 305 and the type of the vehicle data 9 to be recorded by the recording unit 305. In such a configuration, the recording unit 305 records the image ID 8 of the type specified by the server device 3 and the vehicle data 9 of the type specified by the server device 3. In the configuration where the server device 3 specifies these types, the server device 3 transmits first specification data that specifies the type of the image ID 8, to the TCU 21. The reception unit 301 of the TCU 21 receives the first specification data, and the recording unit 305 records the type of the image ID to be recorded, in the second memory 310, in accordance with the first specification data. When the server device 3 is configured to specify these types, the server device 3 transmits second specification data that specifies the type of the vehicle data 9, to the TCU 21. The reception unit 301 of the TCU 21 receives the second specification data, and the recording unit 305 records the type of the vehicle data 9 to be recorded, in the second memory 310, in accordance with the second specification data.

Still another embodiment may be configured such that the type of the image ID 8 output by the display device 22 to the TCU 21 is variable. In this configuration, the server device 3 may specify the type of the image ID 8 output by the display device 22 to the TCU 21.

In the embodiments described above, the image ID 8 is illustrated as being recorded by the recording unit 305. However, the data recorded by the recording unit 305 is not limited to the image ID 8 that uniquely identifies the notification content notified by the display device 22, as long as the state value indicating the state of the vehicle 2 is recorded in the data.

In the embodiments described above, illustrated as a particular value is the state value recorded in the image IDs 8 corresponding to the notification contents which belong to the failure content. However, the particular value is not limited to the state value recorded in the image IDs 8 corresponding to the notification contents which belong to the failure content.

In the embodiments described above, illustrated as a "prescribed condition" in the present disclosure is that the ignition power source is turned off. However, the "prescribed condition" in the present disclosure is not limited to that the ignition power source is turned off, and may be that the TCU 21 receives the transmission instruction data 7 from the server device 3.

In the embodiments described above, the vehicle data 9 is illustrated as the second data. However, the second data is not limited to one of the power source state data 9-1, the current position data 9-2, and the vehicle speed data 9-3. The second data may be any data relating to the vehicle 2. For example, the second data may be data indicating engine speed per unit of time, or data indicating the lapse of time since the ignition power source of the vehicle 2 is turned on.

In the embodiments described above, the vehicle 2 is illustrated as the moving body in the present disclosure. However, the moving body in the present disclosure is not limited to the vehicle 2, and may be an object that moves on the land, in the air, on the sea, or in the water. The object may be, for example, a vehicle, a flying body, or a ship.

Moreover, in the embodiments described above, the TCU 21 is illustrated as the communication device in the present disclosure. However, the communication device in the present disclosure is not limited to the TCU 21, and may be any device that can communicate with the server device 3.

The first processor 200 and the second processor 300 may be constituted of a plurality of processors or may be constituted of a single processor. These processors may be hardware programed to implement the function of each unit described below. In this case, these processors are constituted of, for example, an application-specific integrated circuit (ASIC) or a field programmable gate array (FPGA).

Each unit of the vehicle 2 illustrated in FIG. 1 is exemplary, and specific implementations are not particularly limited. In other words, it is not necessarily needed to implement hardware corresponding individually to each unit, and it is of course possible to adopt the configuration where the function of each unit is implemented by one processor executing a program or programs. In the embodiment disclosed, some of the functions implemented by software may be implemented by hardware, or some of the functions implemented by hardware may be implemented by software. In addition, for other specific detailed configurations regarding each of other units of the vehicle 2, any changes are possible without departing from the scope of the present invention.

In addition, the operations shown in FIGS. 3 to 8 are divided into step units according to the main processing contents, and the present invention is not limited by how the operations are divided into processing units or by the name thereof. Depending on the processing contents, the operations may be divided into more step units. The operations may also be divided so that one step unit may include more processes. The order of the steps may be switched as appropriate without compromising the spirit of the present invention.

The second control program 311 can also be implemented with the second control program 311 being recorded in a portable information recording medium. Examples of the information recording medium include a magnetic recording medium such as a hard disk, an optical recording medium such as a CD, and a semiconductor storage device such as a universal serial bus (USB) memory and a solid state drive (SSD), though other recording media can also be used. The TCU 21 may read and execute the second control program 311 from the information recording medium.

5. Configuration Supported by Above Embodiments

The embodiments disclosed support the following configurations.

(Configuration 1)

A communication device to be installed on a moving body, including: a recording unit that records data in which a state value indicating a state of the moving body is recorded; a recording data control unit that controls recording of the recording unit; and a transmission unit that transmits the data recorded by the recording unit to a server device. The recording data control unit records, in the recording unit, first data that is the data in which the state value is changed to a particular value after the moving body is started, and restricts re-recording of the first data in the recording unit until a prescribed condition is established after the first data is recorded.

According to the communication device in configuration 1, first data is recorded, the first data being the data in which the state value is changed to a particular value after the moving body is started, and then re-recording of the first data is restricted until a prescribed condition is established. This makes it possible to prevent the data transmitted to the server device from including a plurality of overlapped first data in which the same state value is recorded. Therefore, when the server device processes the received data, it is not necessary to perform the processing of selecting any one of data sets, out of the data sets including overlapped contents, as data to be processed, and removing other data sets from the data to be processed. Therefore, the communication device can reduce the processing load of the server device.

(Configuration 2)

The communication device according to configuration 1, in which the recording unit records second data relating to the moving body, other than the first data, in association with the first data, and the transmission unit transmits the second data recorded by the recording unit, together with the first data recorded by the recording unit, to the server device.

According to the communication device in configuration 2, when the second data is transmitted together with the first data to the server device, the server device can use the second data for processing the first data, which makes it possible to expand the types of data processing that the server device can perform. Therefore, the communication device can expand the types of data processing performed by the server device, while reducing the processing load of the server device.

(Configuration 3)

The communication device according to configuration 2, in which the recording unit records the second data of a type specified by the server device and the first data indicating the particular value specified by the server device.

According to the communication device in configuration 3, the first data and the second data specified by the server device can be transmitted to the server device, and thus the data used by the server device for processing can be transmitted. Therefore, the communication device can prevent transmission of data unnecessary to the server device, while reducing the processing load of the server device.

(Configuration 4)

The communication device according to configuration 2 or configuration 3, in which the transmission unit transmits the first data and the second data recorded by the recording unit after the moving body is started, as one piece of data, to the server device.

According to the communication device in configuration 4, the data recorded by the recording unit is transmitted as one piece of data, so that the overhead of transmitting a plurality of data sets can be reduced. Therefore, the communication device can reduce load of communication with the server device, while reducing the processing load of the server device.

(Configuration 5)

The communication device according to any one of configurations 2 to 4 including a reception unit that receives, from the server device, transmission instruction data indicating a transmission instruction of the first data. When the reception unit receives the transmission instruction data or when the moving body is stopped after the moving body is started, the transmission unit transmits the first data and the second data recorded by the recording unit to the server device.

According to the communication device in configuration 5, when the recorded data is transmitted at the timing when the transmission instruction data is received and at the timing when the moving body is stopped after starting up, the recorded data can reliably be transmitted, while the number of times that the recorded data is transmitted can be reduced. Therefore, the communication device can reduce the load of communication with the server device and can achieve reliable transmission of the recorded data, while reducing the processing load of the server device.

(Configuration 6)

The communication device according to configuration 5, in which when the moving body is started and then stopped, or when the reception unit receives the transmission instruction data, the recording unit records the second data without association with the first data, and when the reception unit receives the transmission instruction data or when the moving body is stopped after the moving body is started, the transmission unit transmits the first data and the second data recorded by the recording unit, including the second data not associated with the first data, to the server device.

According to the communication device in configuration 6, the second data at the timing when the recorded data is transmitted is also transmitted, so that the data relating to the moving body at the time of data transmission can be transmitted to the server device together with the recorded data. Therefore, when the server device processes the recorded data, it becomes possible to process the recorded data using the data relating to the moving body at the time of data transmission, and therefore it becomes much more possible to expand the types of data processing that the server device can perform. Therefore, the communication device can expand the types of data processing performed by the server device further, while reducing the processing load of the server device.
(Configuration 7)

The communication device according to any one of configurations 1 to 6, in which the moving body includes a display device that displays information on the state of the moving body indicated by the first data, and a switch capable of switching the information on the state of the moving body displayed by the display device to information on another state of the moving body, and the particular value is the state value indicating a content of failure of the moving body.

According to the communication device in configuration 7, even when the user of the moving body operates the switch to display the information on the failure of the moving body on the display device a plurality of times, it is possible to prevent the data transmitted to the server device from including a plurality of overlapped first data in which the same state value is recorded.
(Configuration 8)

The communication device according to any one of configurations 1 to 6, in which the moving body includes a display device that displays information on the state of the moving body, and the data is information that uniquely identifies information on the state of the moving body displayed by the display device.

According to the communication device in configuration 8, even when the display of the display device is switched, it is possible to prevent the data transmitted to the server device from including a plurality of overlapped first data in which the same state value is recorded.
(Configuration 9)

The communication device according to any one of configurations 1 to 8, in which the prescribed condition is that the moving body is stopped or that the server device issues a transmission instruction of the first data.

According to the communication device in configuration 9, it is possible to prevent the data, recorded until the moving body is stopped or until the server device issues a transmission instruction, from including a plurality of first data in which the same state value is recorded. Therefore, when the data, recorded until the moving body is stopped or recorded until the server device issues a transmission instruction, is transmitted to the server device, it is possible to prevent the data transmitted to the server device from including a plurality of first data in which the same state value is recorded.
(Configuration 10)

A method of controlling a communication device to be installed on a moving body, including the steps of: recording data in which a state value indicating a state of the moving body is recorded; controlling recording of the data; and transmitting to a server device the data recorded in the step of recording. In the step of controlling, first data is recorded, the first data being the data in which the state value is changed to a particular value after the moving body is started, and re-recording of the first data is restricted until a prescribed condition is established after the first data is recorded.

According to the method of controlling a communication device in configuration 10, the same effects as the communication device in configuration 1 can be demonstrated.
(Configuration 11)

A non-transitory computer-readable recording medium recording a program for causing a processor of a communication device to be installed on a moving body to function as: a recording unit that records data in which a state value indicating a state of the moving body is recorded; a recording data control unit that controls recording of the recording unit; and a transmission unit that transmits the data recorded by the recording unit to a server device. The recording data control unit records, in the recording unit, first data that is the data in which the state value is changed to a particular value after the moving body is started, and restricts re-recording of the first data in the recording unit until a prescribed condition is established after the first data is recorded.

The recording medium in configuration 11 demonstrates the same effect as the communication device in configuration 1.

REFERENCE SIGNS LIST

1 . . . Information processing system, 2 . . . Vehicle (moving body), 3 . . . Server device, 6 . . . Upload data, 7 . . . Transmission instruction data, 8 . . . Image ID (first data), 9 . . . Vehicle data (second data), 9-1 . . . Power source state data (second data), 9-2 . . . Current position data (second data), 9-3 . . . Vehicle speed data (second data), 21 . . . TCU (communication device), 22 . . . Display device, 23 . . . Switch, 30 . . . TCU control device, 31 . . . TCU communication unit, 300 . . . Second processor (processor), 301 . . . Reception unit, 302 . . . Transmission unit, 303 . . . Recording trigger generation unit (recording data control unit), 304 . . . Upload trigger generation unit, 305 . . . Recording unit, 310 . . . Second memory, 311 . . . Second control program (program)

What is claimed is:

1. A vehicle, comprising:

a vehicle control device having a first processor;

a display; and a communication unit having a second processor and a memory, wherein the first processor detects a state of the vehicle based on a detection value of a sensor provided in the vehicle and outputs a detection result to the display, the display notifies, to a driver of the vehicle, the state of the vehicle by displaying an image corresponding to the state of the vehicle as indicated by the detection result received, and outputs, to the communication unit, an image identification assigned to each of notification contents with a state value which is a value indicating the state of the vehicle and which is associated with each image identification in advance, the second processor:

when the image identification is received, determines whether or not the image identification received is the image identification of a type that is received for the first time after an ignition power source of the vehicle is turned on;

when it is determined that the image identification is the image identification of the type that is received for the first time after the ignition power source is turned on, and the state value of the image identification received indicates a change to a particular value after the ignition power source of the vehicle is turned on, acquires, from the vehicle control device, a vehicle data including a power source state data indicating a current power source state, a current position data indicating a current position of the vehicle, and a vehicle speed data indicating a current speed of the vehicle;

records, in the memory, the vehicle data acquired in association with the image identification; and restricts re-recording, in the memory, the image identification having the same image identification acquired and the vehicle data associated with the image identification until a prescribed condition is established.

2. The vehicle according to claim 1, wherein the second processor transmits the image identification and the vehicle data recorded by the memory to an external server device.

3. The vehicle according to claim 2, wherein the second processor records the vehicle data of a type specified by the external server device and the image identification of which the state indicates the particular value specified by the external server device.

4. The vehicle according to claim 2, wherein the second processor transmits the image identification that is recorded in the memory after the ignition power source is turned on and the vehicle data associated with the image identification, as one piece of data, to the external server device.

5. The vehicle according to claim 2, wherein the second processor receives, from the external server device, transmission instruction data indicating a transmission instruction of the image identification, or when the vehicle is stopped after the ignition power source is turned on, the second processor transmits the image identification recorded in the memory and the vehicle data associated with the image identification to the external server device.

6. The vehicle according to claim 1, wherein the particular value is a value in which the state value indicates an engine failure of the vehicle or a brake failure of the vehicle.

7. The vehicle according to claim 1, wherein the prescribed condition is that the vehicle is stopped or that the external server device issues a transmission instruction of the image identification.

8. A method of controlling a communication of a vehicle, comprising steps of:

detecting a state of the vehicle based on a detection value of a sensor provided in the vehicle and outputting a detection result to the display;

notifying, to a driver of the vehicle, the state of the vehicle by displaying an image corresponding to the state of the vehicle as indicated by the detection result, and outputting an image identification assigned to each of notification contents with a state value which is a value indicating the state of the vehicle and which is associated with each image identification in advance;

determining whether or not the image identification outputted is the image identification of a type that is outputted for the first time after an ignition power source of the vehicle is turned on;

when determining that the image identification outputted is the image identification of the type that is received for the first time after the ignition power source is turned on, and the state value of the image identification outputted indicates a change to a particular value after the ignition power source of the vehicle is turned on, acquiring, from the sensor, a vehicle data including a power source state data indicating a current power source state, a current position data indicating a current position of the vehicle, and a vehicle speed data indicating a current speed of the vehicle; and recording, in a memory, the vehicle data acquired in association with the image identification outputted, wherein the image identification having the same image identification outputted and the vehicle data associated with the image identification is restricted from being re-recorded in the memory until a prescribed condition is established.

9. A non-transitory computer-readable recording medium recording a communication control program executed by a processor of a vehicle to:

detect a state of the vehicle based on a detection value of a sensor provided in the vehicle and output a detection result to the display;

notify, to a driver of the vehicle, the state of the vehicle by displaying an image corresponding to the state of the vehicle as indicated by the detection result, and output an image identification assigned to each of notification contents with a state value which is a value indicating the state of the vehicle and which is associated with each image identification in advance;

determine whether or not the image identification outputted is the image identification of a type that is outputted for the first time after an ignition power source of the vehicle is turned on;

when determining that the image identification outputted is the image identification of the type that is received for the first time after the ignition power source is turned on, and the state value of the image identification outputted indicates a change to a particular value after the ignition power source of the vehicle is turned on, acquire, from the sensor, a vehicle data including a power source state data indicating a current power source state, a current position data indicating a current position of the vehicle, and a vehicle speed data indicating a current speed of the vehicle;

record, in a memory, the vehicle data acquired in association with the image identification outputted;

and restrict re-recording, in the memory, the image identification having the same image identification acquired and the vehicle data associated with the image identification until a prescribed condition is established.

* * * * *